Patented Mar. 9, 1937

2,073,363

UNITED STATES PATENT OFFICE 2,073,363

BUTADIENYL COMPOUNDS AND PROCESSES FOR PREPARING SAME

Wallace H. Carothers, Fairville, Pa., and Gerard J. Berchet, Wilmington, Del., assignors to E. I. du Pont de Nemours & Company, Wilmington, Del., a corporation of Delaware No Drawing. Application October 29, 1932, Serial No. 640,326

14 Claims. (Cl. 260—33)

This invention relates to the preparation of novel derivatives of butadiene-1,2. The invention further pertains to reactions involving the use of chloro-4-butadiene-1,2 and of certain compounds derived therefrom.

It has been disclosed in a copending application of Carothers and Collins Serial No. 490,538, filed October 22, 1930, now Patent No. 1,950,431, patented March 13, 1934, that the reaction between monovinylacetylene and hydrogen chloride, under certain conditions, yields substantial quantities of chloro-4-butadiene-1,2

$(CH_2=C=CH-CH_2Cl)$, a new compound, which may be obtained in pure form by fractional distillation. One method of producing chloro-4-butadiene-1,2 is illustrated in the following example:

*Example A.*—In each of 20 bottles were placed 175 g. of concentrated hydrochloric acid, 25 g. of calcium chloride and 50 g. of monovinylacetylene. The bottles were closed and shaken continuously for 5 hours, the supernatant oily layers were drawn off and combined, washed with water, stabilized with pyrogallol, dried with anhydrous calcium chloride, and distilled thru a long column. The fractions collected were: (1) 74 g. at 30–35° C., (2) 222 g. at 50–75° C., (3) 576 g. at 80–95° C., (4) 77 g. at 95–120° C., and (5) 125 g. residue. Fraction (3) was chiefly chloro-4-butadiene-1,2. On redistillation it yielded 446 g. of pure product.

This compound has a boiling point of 86–88° C., a refractive index of about 1.477 at 20° C. and specific gravity of about 0.991 at 20° C.

It has now been found that this compound contains its chlorine atom in rather loose combination and hence is capable of undergoing many reactions in which chlorine is replaced by other groups with the formation of new and valuable compounds.

One object of the invention pertains to the preparation of novel derivatives of butadiene-1,2. A further object relates to the preparation of derivatives of butadiene-1,2 containing a substituent in the 4-position by interacting chloro-4-butadiene-1,2 with compounds having a radical which will displace the labile chlorine atom. A still further object relates to the preparation of the new compounds comprising hydroxy-4-butadiene-1,2 and its ethers and esters, amino-4-butadines-1,2 and other butadine-1,2 compounds containing a substituent other than a halogen in the 4-position. Other objects of the invention will become apparent from the following description.

The invention is described in the following examples which are illustrative only and are not intended to limit the scope of the invention:

*Preparation of hydroxy-4-butadiene-1,2*

*Example 1.*—A solution of 676 g. of sodium carbonate in 1500 g. of water is heated at 60–90° C., with 531 g. of chloro-4-butadiene-1,2 with constant stirring for 15 hours. During the reaction sodium chloride crystallizes from the water. At the end of the reaction the water insoluble layer which contains most of the hydroxy compound is separated from the water layer and dried with anhydrous sodium sulfate. A further quantity may be obtained by extracting the water layer and the precipitated sodium chloride with ether. The product may be purified by fractional distillation, the portion boiling from 68–70° C. at 53 mm. pressure being substantially pure hydroxy-4-butadiene-1,2. An appreciable amount of higher boiling material and also traces of vinylacetylene are formed in the reaction. If a caustic alkali such as sodium hydroxide is used in place of the sodium carbonate, the proportion of these by-products is increased.

Hydroxy-4-butadiene-1,2 is a colorless liquid which boils at 126–8° C. at 756 mm. pressure. At 20° C. it has a density of 0.918 and a refractive index of 1.4759 for the sodium line of the spectrum. It is quite soluble in water and very soluble in the common organic solvents. It has a powerful vesicant action on the skin and its vapor has a strongly irritating effect upon the mucous membranes. It shows a tendency to polymerize when heated. It is readily hydrogenated by means of a platinum oxide catalyst to normal butyl alcohol, and is converted by boiling with strong hydrochloric acid into the original chloro-4-butadiene-1,2. If cuprous chloride is present during the latter reaction, the isomeric chloro-2-butadiene-1,3 results.

Other alkali metal carbonates, e. g., potassium carbonate, may be used in the above example in place of the sodium carbonate. The alkaline earth oxides and carbonates, e. g., CaO, MgO, $CaCO_3$, $MgCO_3$, etc. may also be used.

While the hydrolysis of chloro-4-butadiene-1,2 is preferably carried out in the presence of an alkaline reagent, substantial hydrolysis takes place by merely heating chloro-4-butadiene-1,2 with water, the yields however being considerably lower than when an alkali metal carbonate is present.

Ethers of hydroxy-4-butadiene-1,2

*Example 2.—Methoxy - 4 - butadiene-1,2*—One mole of hydroxy-4-butadiene-1,2 is placed in a flask provided with a stirrer and a reflux condenser. Dimethyl sulfate and 50% aqueous sodium hydroxide are added to the stirred mixture at such a rate that the mixture remains constantly alkaline while its temperature does not rise above about 60° C. After about 2 moles of dimethyl sulfate has been added the mixture is stirred and heated to boiling for about one hour. The methyl ether of hydroxy-4-butadiene-1,2 is then separated, dried, and distilled. It is a colorless liquid boiling at 87° to 89° C. and having a density at 20° C. of about 0.845 and a refractive index for the sodium line of 1.435. It is readily hydrogenated under conventional hydrogenation conditions to methyl n-butyl ether.

Corresponding aliphatic ethers such as the ethyl, propyl, and butyl and higher alkyl ethers can be prepared quite readily in the same way. Preferred alkylating agents are alkyl esters of strong inorganic acids, particularly the alkyl sulfates, e. g., dimethyl sulfate, diethyl sulfate, etc., and alkyl halides, e. g., methyl chloride, ethyl chloride, methyl iodide, ethyl iodide, etc.

Aromatic ethers of hydroxy-4-butadiene-1,2 may be made by treatment of chloro-4-butadiene-1,2 with metallic phenolates.

*Example 3.—Phenoxy-4-butadiene-1,2*—Ninety-four grams of phenol dissolved in 200 cc. of anhydrous alcohol is treated with 23 g. of metallic sodium. 88.5 g. of chloro-4-butadiene-1,2 is then added slowly with stirring. After heating for about 2 hours at 80° C., the reaction is practically complete. Addition of water gives an insoluble oil which boils principally between 70° and 90° C. at 3 mm. On washing the distillate with sodium hydroxide, drying, and redistilling, substantially pure phenoxy-4-butadiene-1,2 is obtained. It boils at 73–5° C. at 4 mm. and has a density of 1.003 and a refractive index (sodium line) of 1.5501, both at 20° C. On hydrogenation it yields normal butyl phenyl ether.

The phenoxy-4-butadiene-1,2 may also be made by refluxing equimolecular proportions of chloro-4-butadiene-1,2, phenol, and potassium carbonate in benzene for from four to six hours. In this case the ether is accompanied by an isomeric butadienyl phenol, $HOC_6H_4CH_2CH=C=CH_2$, a new compound boiling at 96–100° C. at 1 mm. having an index of refraction of 1.5740 at 20° C. for the sodium line, and having a density at 20° C. of 1.0432. It may be separated from the ether by solution in alkali. Other aromatic ethers both monocyclic and polycyclic, e. g., naphthyl, may be made by either of the above methods by the use of the appropriate phenol. The methods adaptable for the preparation of the aryl ethers are in general unsuitable for the preparation of aliphatic ethers. For example, chloro-4-butadiene-1,2 and sodium ethoxide give principally vinyl acetylene instead of ethoxy-4-butadiene-1,2. These aliphatic ethers may be made, however, from hydroxy-4-butadiene-1,2 itself, as described above in Example 2.

*Example 4.—Acetate of hydroxy-4-butadiene-1,2*—Eighty-two g. of fused sodium acetate and 88.5 g. of chloro-4-butadiene-1,2 are dissolved in 200 cc. of glacial acetic acid and the mixture is refluxed for 7 hours. A large volume of water is then added and the water-insoluble layer which contains most of the acetate is separated, dried over sodium sulfate and distilled. The pure product boils at 81° C. at 140 mm. pressure, or at 138° C. at 760 mm. pressure. At 20° C. it has a density of 0.9658 and a refractive index of 1.4504 for the sodium line. On catalytic hydrogenation with a platinum catalyst, it gives normal butyl acetate.

Instead of sodium acetate in the above example, other metallic acetates such as those of potassium, lead and silver may be used and other solvents may be used in place of acetic acid. The solvents suitable for those purposes are those which have some solvent action upon both the reactants and which do not react with the reaction products. Other esters may be similarly prepared by using salts of other carboxylic acids. It is often more convenient, however, to make the esters by esterification of the hydroxy-4-butadiene-1,2 by methods such as heating a mixture of carboxylic acid and hydroxy-4-butadiene-1,2 in the presence of traces of strong mineral acids as esterification catalysts, or the anhydride or chloride of the acid can be reacted with the hydroxy-4-butadiene-1,2, preferably in the presence of a substance capable of combining with acids, such as sodium hydroxide or pyridine. The methods described for the preparation of aliphatic esters are also satisfactory for preparing aromatic esters. The properties of some of the esters are given in the following table:

| Acid | Ester | Boiling point | Refractive index | Density |
|---|---|---|---|---|
| Formic | $HCO-O-CH_2-CH=C=CH_2$ | 120.5–121.5° C | 1.4551 | 0.990 |
| Acetic | $CH_3CO-O-CH_2-CH=C=CH_2$ | 140 at 770 mm | 1.4504 | 0.966 |
| Trichloroacetic | $CCl_3CO-O-CH_2-CH=C=CH_2$ | 96–97.5 at 15 mm | 1.4961 | 1.338 |
| Succinic | $CH_2-COO-CH_2-CH=C=CH_2$ <br> $\|$ <br> $CH_2-COO-CH_2-CH=C=CH_2$ | 143–145 at 5 mm | 1.4939 | 1.086 |
| Benzoic | $C_6H_5COO-CH_2-CH=C=CH_2$ | 128–130 at 10 mm | 1.5451 | 1.077 |
| Phthalic | $C_6H_4\begin{array}{l}COO-CH_2-CH=C=CH_2\\COOH\end{array}$ | Undistillable liquid | | |
| Paranitrobenzoic | $NO_2C_6H_4CO-O-CH_2-CH=C=CH_2$ | M. P. 48–49° C | | |

The p-nitrobenzoic ester described above can be reduced to the corresponding p-aminobenzoic ester, a compound which has strong local anesthetic action.

Thus, 27 g. of the p-nitrobenzoic ester of hydroxy-4-butadiene-1,2 is mixed with an excess of iron powder and water to form a paste. One cubic centimeter of concentrated hydrochloric acid is added, and the paste is stirred and occasionally warmed until spontaneous reaction ceases. Then it is heated for one hour at 80° C. The mixture is then neutralized with sodium hydroxide, filtered, and the residue extracted with benzene. Distillation of the benzene solution leaves a crystalline residue. It can be purified either by crystallization from benzene or by distillation in vacuo. The pure p-aminobenzoic ester of hydroxy-4-butadiene-1,2 is finally obtained in the form of pure white crystals melting at 65° C. (copper block method).

*Example 5—Chlorocarbonic Ester of Hydroxy-4-Butadiene-1,2.*—Slightly less than one mole of hydroxy-4-butadiene-1,2 is added to one mole of liquid phosgene at about —15° C. It is warmed gently to remove dissolved HCl and excess phosgene. The black residue is washed with cold water, dried, and distilled. The chlorocarbonate, CH<sub>2</sub>=C=CH—CH<sub>2</sub>—O—COCl is obtained as a colorless liquid boiling at 66 to 68° C. at 57 mm. Its density is about 1.147 and its refractive index for the sodium line is about 1.465, both measured at 20° C. The yield is 60 to 70% of the theory.

The chlorocarbonate may also be obtained by passing gaseous phosgene into the cold liquid hydroxy-4-butadiene-1,2 until the calculated amount has been absorbed.

The chlorocarbonate described above is a convenient source for the preparation of urethanes containing the butadienyl radical (CH<sub>2</sub>=C=CH—CH<sub>2</sub>—).

For example, a 15% solution of the chlorocarbonate in benzene is treated with a stream of dry ammonia, until the gas is no longer completely absorbed. The precipitated ammonium chloride is filtered off and the filtrate is evaporated in vacuo. The crystalline residue is recrystallized from a mixture of benzene and petroleum ether. The pure butadienyl urethane, CH<sub>2</sub>=C=CH—CH<sub>2</sub>—O—CO—NH<sub>2</sub>, is thus obtained in the form of white crystals melting at 41 to 41.5° C. (copper block).

In a similar manner by treating the chlorocarbonate with dimethylamine and with methyl aniline, respectively, the urethanes described below are obtained:

CH<sub>2</sub>=C=CH—CH<sub>2</sub>—O—CO—N(CH<sub>3</sub>)<sub>2</sub> liquid boiling at 59 to 60° C. at 1 mm.

CH<sub>2</sub>=C=CH—CH<sub>2</sub>—O—CO—N(CH<sub>3</sub>)C<sub>6</sub>H<sub>5</sub> liquid boiling at 136–137° C. at 2.5 mm.

The urethanes described above are useful compounds for medicinal purposes. Other compounds of this class may be obtained by treating hydroxy-4-butadiene-1,2 with alkyl or aryl isocyanates. Thus, one part of hydroxy-4-butadiene-1,2 is treated with an equivalent amount of α-naphthyl isocyanate. A vigorous reaction occurs, and the mixture on being cooled sets to a solid crystalline mass. After being crystallized from benzene the urethane, CH<sub>2</sub>=C=CH—CH<sub>2</sub>—O—CO—NHC<sub>10</sub>H<sub>7</sub>, is obtained in the form of small white crystals melting sharply at 117° C.

The chlorocarbonate described above may also be used for the preparation of esters of the general formula CH<sub>2</sub>=C=CH—CH<sub>2</sub>—O—CO—OR. For this purpose the chlorocarbonate is treated with the alcohol or phenol corresponding to the ester desired. Substituted alcohols and phenols may be used in this process, e. g., aminophenols.

Inorganic esters of hydroxy-4-butadiene-1,2 may be prepared either from the chloro-4-butadiene-1,2 or from the alcohol itself. The preparation of the chloride (chloro-4-butadiene-1,2) by the action of concentrated hydrochloric acid on hydroxy-4-butadiene-1,2 has already been mentioned in the paragraph following Example 1. The same product may be obtained by the action of phosphorous trichloride in pyridine solution. The corresponding iodide (iodo-4-butadiene-1,2) may be conveniently obtained as follows: 150 g. of sodium iodide and 89 g. of chloro-4-butadiene-1,2 are dissolved in acetone and allowed to stand at 25° C. for 3 hours. Sodium chloride separates during the reaction. Upon dilution with water and extraction with ether the crude iodide is separated and dried over magnesium sulfate. Upon distillation a liquid is obtained which boils at 43–45° C. at 38 mm. pressure. It has a density of 1.716 and a refractive index of 1.5709. It gives an elementary analysis corresponding to the formula C<sub>4</sub>H<sub>5</sub>I and polymerizes readily even at room temperature. This and other reactions indicate that the iodo-4-butadiene-1,2 is isomerized rather readily to iodo-2-butadiene-1,3 which, like its chlorine analog, has a strong tendency to polymerize.

Among the inorganic butadiene-1,2 esters are cyanides, thiocyanates and isothiocyanates.

The following examples illustrate the preparation of esters embraced within this class:

*Example 6.—Butadienyl thiocyanate*—One mole of sodium thiocyanate is dissolved in 400 cc. of 85% alcohol. One mole of chloro-4-butadiene-1,2 is added and the mixture is allowed to stand at room temperature for 16 hours. The sodium chloride is then filtered off, the filtrate treated with 1200 cc. of water and the oil which separates is dried and distilled. It boils unsharply at 65–75° C. at 14 mm. and has the specific gravity

D$^{20}_{4}$ 1.0403.

A considerable residue remains in the flask.

Butadienyl thiocyanate is very unstable. At room temperature, it polymerizes with evolution of heat to a brown, plastic, non-elastic, non-coherent mass, insoluble in the common organic solvents. This stage is attained in about 48 hours at 25° C.

Butadienyl thiocyanate is probably an isothiocyanate, CH<sub>2</sub>=C=CH—CH<sub>2</sub>NCS, since it reacts readily with ethanolamine. The reaction product is, however, polymeric in appearance.

Butadienyl cyanide (cyano-1-butadiene-1,3 or the nitrile of β-vinylacrylic acid) is obtained when chloro-4-butadiene-1,2 is allowed to react with sodium cyanide in alcoholic medium.

CH<sub>2</sub>=C=CHCH<sub>2</sub>Cl+NaCN→
    CH<sub>2</sub>=CH—CH=CH—CN+NaCl

Its formation evidently involves a rearrangement of one of the double bonds of the butadienyl radical. The nitrile of β-vinylacrylic acid is a very reactive compound. It reacts with itself to form rubber-like polymers, and yields addition compounds with monohydric alcohols. The following material may serve as examples of its formation and behavior.

*Example 7.—Butadienyl cyanide*—Sodium cyanide (250 g.) was dissolved in a solution of 250 cc. of water and 700 cc. of methanol in a 3 liter flask equipped with stirrer and reflux condenser. Chloro-4-butadiene-1,2 (354 g.) was introduced, and the mixture was gently heated with agitation until the reaction became exothermic. After the reaction had proceeded an hour, the mixture was cooled and the sodium chloride was removed by filtration. The filtration was poured into 1.5 liters of water, the water insoluble layer was separated, and the aqueous solution was twice ether extracted. The water insoluble layer and the ethereal extracts were combined and dried over calcium chloride. The ether was evaporated and by distillation of the residue 90 g. of crude product boiling from 36° at 50 mm. to 55° C. at 3 mm. was received. This material was washed once with cold dilute hydrochloric acid and was dried over magnesium sulfate. Distillation of the dried material gave 64 g. of butadienyl cyanide which boiled at 49–53° C. under 30 mm. The yield was 20% of the theoretical amount.

*Physical properties of butadienyl cyanide.*—B. P., 135–8°/760 mm. with polymerization, 65–8° C./58 mm., 48–50° C./28 mm.;

$$D\frac{20°}{4}, 0.8644; N\frac{20°}{D}, 1.4880.$$

*Example 8.—By-products in the preparation of butadienyl cyanide*—The aqueous alcoholic solutions from 6 preparations of butadienyl cyanide (as described above) were continuously ether extracted during 24 hours. Fractionation by distillation of the dried ethereal solution gave the following compounds. Methoxy-1-cyano-4-butene-2 (CH$_3$—O—CH$_2$—CH=CH—CH$_2$—CN) (63 g.); B. P., 65–7° C./7 mm.;

$$D\frac{20°}{4}, 0.9318; N\frac{20°}{D}, 1.4397.$$

β.δ-Dimethoxyvaleronitrile (CH$_3$—O—CH$_2$—CH$_2$—CH(OCH$_3$)—CH$_2$—CN)

(288 g.); B . P., 70–3° C./1 mm.;

$$D\frac{20°}{4}, 0.9788; N\frac{20°}{D}, 1.4288.$$

A compound C$_7$H$_{10}$ON$_2$, structure unknown, (123 g.); B. P., 131–4° C./0.5 mm.;

$$D\frac{20°}{4}, 1.0293; N\frac{20°}{D}, 1.4480.$$

These three compounds are formed by the addition of one mole of methanol, two moles of methanol, and a mole of methanol and hydrogen cyanide, respectively, to butadienyl cyanide. Such addition is not limited to methanol, but may occur between other monohydric alcohols and butadienyl cyanide under the catalytic influence of alkaline reagents such as sodium cyanide, sodium methoxide, and sodium ethoxide.

*Example 9.—Preparation of β.δ-dimethoxycaleronitrile*

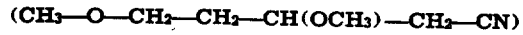
(CH$_3$—O—CH$_2$—CH$_2$—CH(OCH$_3$)—CH$_2$—CN)

Butadienyl cyanide (79 g.) stabilized by hydroquinone was added dropwise during half an hour to a vigorously agitated solution of 2 g. of sodium in 64 g. of anhydrous methanol at 60° C. After an hour the reaction mixture was cooled, diluted with water, and ether extracted. The ethereal solution was washed with dilute acid and dried. From the dried ethereal solution there was received by distillation 32 g. of β.δ-dimethoxyvaleronitrile which boiled at 72–4° C./1 mm.;

$$D\frac{20°}{4}, 0.9777; N\frac{20°}{D}, 1.4289.$$

The yield was 23% of the theoretical amount.

*Polymerization of butadienyl cyanide*

*Example 10.—Light polymerization*—A sample of butadienyl cyanide in glass exposed to a 200-watt Mazda lamp for 112 hours at 40–50° C. was completely converted into a colorless granular mass of rubber-like globules. This granular product is identical in appearance with ω-polychloroprene, which is the granular polymer of chloro-2-butadiene-1,3 described in Carothers and Collins application Ser. No. 519,243 filed February 28, 1931. In a parallel sample isolated from the light, the only change was a slight increase in viscosity and the presence of a speck of granular polymer.

*Example 11—Heat polymerization.*—A sample of butadienyl cyanide heated in a glass tube at 100° C. for 13 hours was converted to a colorless, viscous sirup which contained 14% of alcohol-insoluble polymer, 42% of high boiling oil, and 21% of unchanged monomer. The alcohol-insoluble material was a soft, plastic, and rubber-like mass. It was compounded with ½% tetramethylthiuram disulfide, 1% phenyl-β-naphthylamine, 1% benzidine, 3% sulfur, and 5% zinc oxide and heated at 125° C. for one hour. The plastic properties were partly suppressed, but the vulcanization was incomplete. The rubber-like product could be stretched without breaking to 1800% of its initial length; on release it instantly returned to 400%, and after 10 minutes, to 200% of its initial length.

*Readily polymerizable derivatives of butadienyl cyanide*

Butadienyl cyanide may be converted to monomeric chemical individuals capable of undergoing polymerization. The formation of ethyl β-vinylacrylate, and β-vinylacrylic acid and their polymers from butadienyl cyanide may serve as examples of such conversion.

*Example 12—Ethyl β-vinylacrylate and its polymer.*—Butadienyl cyanide (40 g.) was introduced into a cooled solution of 100 g. of conc. sulfuric acid in 100 g. of ethanol. The mixture was refluxed during 7 hours and the viscous solution was cooled and poured into ice water. There separated a soft, plastic, and rubber-like mass evidently the plastic polymer of ethyl β-vinylacrylate. Ether extraction of the solution, and distillation of the ethereal solution gave ethyl β-vinylacrylate which boiled at 65–7° C./30 mm.;

$$D\frac{20°}{4}, 0.9336; N\frac{20°}{D}, 1.4723.$$

The ethyl β-vinylacrylate was readily polymerized to a rubber-like mass by heating at 100° during 10 hours.

*Example 13—β-Vinylacrylic acid and its polymer.*—Butadienyl cyanide (10 g.) was introduced into a solution of 60 cc. of conc. hydrochloric acid in 100 cc. of ether. After the solution had stood 6 days at room temperature, it was diluted with water and continuously ether extracted. Distillation of the dried ethereal extract gave β-vinylacrylic acid which melted at 71° C. The distillation residue was a polymeric mass, evidently the polymer of β-vinylacrylic acid.

*Amines of hydroxy-4-butadiene-1,2*

Chloro-4-butadiene-1,2 reacts readily with amines and ammonia to form amino-4-butadienes-1,2. This reaction is illustrated in the following examples:

*Example 14.—Amino-4-butadiene-1,2,*

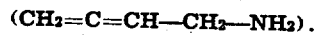
(CH$_2$=C=CH—CH$_2$—NH$_2$).

Fifty grams of chloro-4-butadiene-1,2 and 125 cc. of liquid ammonia are allowed to react for 24 hours at room temperature in a closed container. After evaporation of the unused ammonia the residue is distilled under reduced pressure. The fraction boiling at 37–38° C. at 40 mm. is the primary amine. It is a liquid of strong ammoniacal odor, soluble in water to give an alkaline solution. Its refractive index is 1.4290. On treatment with alpha naphthyl isocyanate it gives alpha-N-naphthyl-N'-2,3-butadienyl-1-urea

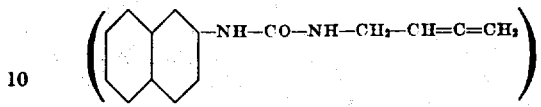

a crystalline compound melting at 77° C. On hydrogenation the amine gives n-butylamine. Small amounts of di- and tri- (2,3-butadienyl) amines are formed along with the primary amine in the above reaction with liquid ammonia. They remain in the residues from the purification of the primary amine and may, if desired, be separated and purified by fractional distillation.

The liquid ammonia is preferably used in excess in order to obtain high yields of amine.

*Example 15—Di(2,3-butadienyl) amine and tri(2,3-butadienyl) amine.*—The secondary and tertiary amines may be prepared in higher yield as follows: Chloro-4-butadiene-1,2 is shaken with an excess of concentrated ammonium hydroxide for 24 hours. The insoluble oily layer is separated, united with the material obtained by ether extraction of the water layer and finally dried and fractionally distilled at 1.5 mm. pressure. The material distilling at 56–58° C. is the secondary amine and that at 85–90° C. is the tertiary amine.

The secondary amine is obtained in pure form by another fractional distillation. It boils at 48° C. at 0.1 mm. pressure, has a density of 0.8783 and a refractive index of 1.5168. On hydrogenation by means of a platinum catalyst it gives n-dibutylamine. The di(2,3-butadienyl) amine reacts with phenyl isocyanate to give phenyl di(2,3-butadienyl) urea, a crystalline compound which melts at 91° C. after recrystallization from ligroin.

The tertiary amine may likewise be purified by another distillation. It boils at 81° C. at 0.1 mm. pressure, and has a density of 0.8934 and a refractive index of 1.5320. It reacts with methyl iodide to give tri(2,3-butadienyl) methyl-ammonium iodide, a crystalline compound melting at 111°.

*Example 16.—Mono(2,3-butadienyl) aniline and di(2,3-butadienyl) aniline.*—Fifty grams of chloro-4-butadiene-1,2 and sixty grams of aniline are allowed to react at 30° C. for 24 hours. The crystalline mass thus obtained is treated with dilute alkali and the oil which separates is washed with dilute acetic acid, dried and distilled. The secondary amine distills over in the neighborhood of 90–95° C. and the tertiary amine in the neighborhood of 120° C., both at 1 mm. pressure.

The mono(2,3-butadienyl) aniline thus obtained when further purified by distillation boils at 92–94° C. at 1 mm. pressure, and has a density of 0.9960 and a refractive index of 1.5890. It reacts with toluene sulfonyl chloride to give butadienyl phenyl toluene sulfone amide, a crystalline compound melting at 83° C. It may also be hydrogenated by means of a platinum catalyst giving n-butylaniline.

The tertiary amine di(2,3-butadienyl) aniline may be purified by another distillation. It then has a boiling point of 120° C. at 1 mm. pressure, a density of 0.9873 and a refractive index of 1.5948.

The refractive indices given for the above compounds are determined at 20° C. for the yellow line of the sodium spectrum. Likewise, the densities are determined at 20° C.

From the above examples it will be seen that a general method has been disclosed for the preparation of primary, secondary, and tertiary amines containing one or more 2,3-butadienyl radicals $CH_2=C=CH-CH_2-$. The other radicals attached to the nitrogen atom may be either aliphatic or aromatic according to the type of amine used to react with the chloro-4-butadiene-1,2. Thus, aliphatic secondary and tertiary amines of butadiene may be prepared by using in lieu of aliline in Example 9, methyl- and dimethylamine, ethyl- and diethylamine, or any of the corresponding higher aliphatic amines such as stearylamine. Substituted amines such as ethanolamine may be used. Other aromatic amines which may be used in the process of Example 9 in lieu of aniline are toluidine, N-methyl-aniline, anisidine, naphthylamine, cumidine, and the like. Heterocyclic secondary amines such as piperidine may likewise be used.

The reacting amine may be used as such with or without solvents. Likewise, as illustrated in the above examples, the reaction may be carried out at elevated or room temperatures. Temperatures below room temperature may also be used.

The 2,3-butadienylamines are all new compounds, never before described in the literature. They may be used as indicated in the above examples for the synthesis of other new organic compounds through reactions involving either the double bonds of the butadienyl group or the nitrogen atom. Butadienylamines may also be used for a variety of purposes for which other organic amines are used, such as the manufacture of dyestuffs and pharmaceutical chemicals and for the inhibition of the oxidation of readily oxidized substances such as rubber and naturally occurring unsaturated fatty oils.

Chloro-4-butadiene-1,2 may also be reacted with tertiary amines to produce quaternary ammonium salts containing one or more butadienyl radicals. Thus, one mole of trimethylamine is dissolved in benzene and one mole of chloro-4-butadiene-1,2 is added. The mixture is allowed to stand for about 12 hours, and is then filtered. The residue on the funnel is a crystalline mass of 2,3-butadienyl-trimethylammonium chloride $(CH_2=C=CH-CH_2-N(CH_3)_3Cl)$. The yield is practially quantitative. The compound melts at about 200° C. It dissolves readily in water and when its aqueous solution is treated with cold caustic alkali a smooth reaction occurs with the liberation of vinylacetylene and trimethylamine. Pyridine, dimethylaniline, etc., may be used in place of the trimethylamine of the above example.

*Organic acids and their derivatives formed from halogen-4-butadiene-1,2*

Chloro-4-butadiene-1,2 reacts readily with compounds having an active methylenic group in which 1 or 2 hydrogen atoms are replaced by an alkali metal. Examples of this class of compounds are malonic ester, acetoacetic ester and barbituric acid. Other compounds of this class such as indene, cyclopentadiene, benzoylacetic ester, ethyl oxalacetate, etc., would react in the same manner.

*Example 17.—Butadienyl acetic acid.*—A solution of 2 moles of monosodiomalonic ester and 2 moles of chloro-4-butadiene-1,2 in absolute alcohol is heated and stirred for 16 hours. The sodium chloride formed is filtered off and the filtrate evaporated under reduced pressure. The residue consists chiefly of butadienylmalonic ester, B. P. 101–103° C. at 1.5 mm., $D_4^{20}$, 1.0279.

The ester is saponified by adding it slowly and with constant stirring to a cold concentrated solution of potassium hydroxide in water, the alkali being taken in excess. As soon as all the ester has dissolved in the alkaline solution, this latter is neutralized with the calculated quantity of concentrated hydrochloric acid and extracted with ether. The residue left on evaporation of the ether extract is then heated at 165–175° C. until no more carbon dioxide is evolved. Distillation gives a mixture of acidic and non-acidic products, with a considerable amount of undistillable residue. The acidic material, readily separated from the mixture by washing with alkali and acidifying the alkaline solution, is butadienylacetic acid, $CH_2=C=CH-CH_2-CH_2-COOH$. It boils at 86–88° C. at 0.2 mm. and has the specific gravity $D_4^{20}$ 1.0189.

The non-acidic material is the ethyl ester of butadienylacetic acid, $CH_2=C=CH-CH_2-CH_2-COOC_2H_5$, whose formation is due to an incomplete saponification of butadienylmalonic ester under the experimental conditions described. This ester can be readily transformed into the acid by heating for half an hour with a 10% solution of potassium hydroxide.

Butadienylacetic acid shows a certain tendency to polymerize at elevated temperature. Twelve grams of acid are heated at 95–105° C. for 52 hours. The brown material gives on vacuum distillation 8.2 g. of unchanged acid and 3.2 g. of a plastic, nonelastic, sticky residue, slowly soluble in alkali.

On catalytic hydrogenation with a platinum catalyst, butadienylacetic acid gives n-caproic acid; on oxidation with potassium permanganate, it gives exclusively succinic acid.

By a slight modification of the experimental conditions, another compound, methylethinylpropionic acid, $CH_3-C=C-CH_2CH_2COOH$, isomeric with butadienylacetic acid may be obtained in substantial amounts from butadienylmalonic ester.

Five hundred and ninety grams of butadienylmalonic ester is added in about 30 minutes to a solution of 750 g. of potassium hydroxide in 1000 cc. of water. The temperature rises to 65° C. during the addition. The solution is heated 3 hours at 75–80° C. then neutralized with hydrochloric acid and worked up as described above. The product obtained on heat treatment of the dibasic acid consists of a mixture of butadienylacetic acid with a solid acid which crystallizes in the receiver and can be separated by filtration. This compound, which melts at 96–97° C. and boils at 97–99° C. at 1 mm., is isomeric with butadienylacetic acid. On oxidation with permanganate, it gives succinic acid and acetic acid. Its structure must accordingly be that of methylethinylpropionic acid, $CH_3C=C-CH_2CH_2COOH$.

Butadienylacetic acid can be readily isomerized to methylethinylpropionic acid. A solution of butadienylacetic acid in twice the calculated amount of 10% aqueous sodium hydroxide is heated at a temperature of 80–110° C. for 24 to 60 hours. On acidification with concentrated sulfuric acid, the oil which separates crystallizes on cooling. The crystalline product, after drying on a porous plate, consists of pure methylethinylpropionic acid. Methylethinylpropionic acid gives on bromination dibromo-2,3-pentene-2-carboxylic acid-5, $CH_3-CBr=CBr-CH_2CH_2COOH$, a solid melting at 42° C.

Esters of butadienylacetic acid and methylethinylpropionic acid are readily obtained by refluxing the acid with an excess of the alcohol (1.5 to 2 times the calculated quantity) in presence of a small amount of sulfuric acid for 4 or 5 hours. The product is then fractionated, the crude ester washed with alkali and redistilled.

*Esters of butadienylacetic acid*

| | | | |
|---|---|---|---|
| Methyl ester | $CH_2=C=CH-CH_2CH_2COOCH_3$ | $B_{14}$ 63–64° | $D_4^{20}$ 0.9611 |
| Ethyl ester | $CH_2=C=CH-CH_2CH_2COOC_2H_5$ | $B_{14}$ 73–74° | $D_4^{20}$ 0.9382 |
| Butyl ester | $CH_2=C=CH-CH_2CH_2COOC_4H_9$ | $B_1$ 74.5–75.5° | $D_4^{20}$ 0.9160 |
| Heptyl ester | $CH_2=C=CH-CH_2CH_2COOC_7H_{15}$ | $B_1$ 105–106° | $D_4^{20}$ 0.8957 |
| Butadienyl ester | $CH_2=C=CH-CH_2CH_2COOCH_2CH=C=CH_2$ | $B_{1.5}$ 85–86° | $D_4^{20}$ 0.9730 |
| Phenylethyl ester | $CH_2=C=CH-CH_2CH_2COOCH_2CH_2C_6H_5$ | $B_{0.5}$ 135–38° | $D_4^{20}$ 1.0238 |

*Esters of methylethinylpropionic acid*

| | | | |
|---|---|---|---|
| Methyl ester | $CH_3C\equiv C-CH_2CH_2COOCH_3$ | $B_{13}$ 70° | $D_4^{20}$ 0.9764 |
| Ethyl ester | $CH_3C\equiv C-CH_2CH_2COOC_2H_5$ | $B_{15}$ 83–84° | $D_4^{20}$ 0.9503 |
| Butyl ester | $CH_3C\equiv CCH_2CH_2COOC_4H_9$ | $B_{0.5}$ 79–80° | $D_4^{20}$ 0.9256 |
| Heptyl ester | $CH_3C\equiv CCH_2CH_2COOC_7H_{15}$ | $B_1$ 117–119° | $D_4^{20}$ 0.8978 |
| Butadienyl ester | $CH_3C\equiv CCH_2CH_2COOCH_2CH=C=CH_2$ | $B_1$ 94–96° | $D_4^{20}$ 0.9851 |
| Phenylethyl ester | $CH_3C\equiv CCH_2CH_2COOCH_2CH_2C_6H_5$ | $B_{0.5}$ 137–38° | $D_4^{20}$ 1.0311 |

*Example 18.—Butadienylacetone.*—A solution of 2 moles of monosodioacetoacetic ester and 2 moles of chloro-4-butadiene-1,2 in 1000 cc. of absolute alcohol is heated and stirred 16 hours. The sodium chloride is then filtered and the filtrate evaporated under reduced pressure. The residue consists chiefly of butadienyl acetoacetic ester boiling at 89–91° C. at 0.3 mm., $D_4^{20}$ 1.0098.

Two hundred and sixty grams of the keto ester is stirred with a cold 10% solution of 100 g. of sodium hydroxide for 45 minutes, when practically all goes in solution. The mixture is extracted with ether to remove the small quantity of insoluble material, then neutralized and again extracted. Distillation of the ether solution gives 88 g. of butadienylacetone, $$CH_2=C=CH-CH_2-CH_2-CO-CH_3,$$

and a fairly large residue. The ketone boils at 58-60° C. at 11 mm. and has the density $$D_4^{20}\ 0.8927.$$

The ketone is obtained in this reaction through the intermediate stage of the unstable acid, $CH_3COCH(COOH)CH_2CH=C=CH_2$, which loses carbon dioxide at room temperature.

Butadienylacetone may also be obtained by heating the keto ester with 10% sulfuric acid at 90-100° C. for 21 hours. The reaction is incomplete, much unchanged ester being recovered. Butadienylacetone gives on catalytic hydrogenation n-amylmethyl ketone. On ozonization it gives levulinic aldehyde. With sodium hypobromite it gives butadienylacetic acid, $CH_2=C=CH-CH_2CH_2COOH$. Hydration with concentrated sulfuric acid gives, instead of the expected heptanedione-2,6, its dehydration product, methyl-1-cyclohexene-1-one-3,

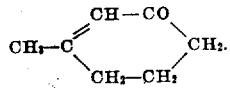

Example 19. — *Ethyl-butadienyl barbituric acid*.—Twenty-five grams of ethylbarbituric acid is dissolved in a solution of 8 g. of sodium hydroxide in 100 cc. of water. Twenty grams of chloro-4-butadiene-1,2 is added. The mixture is gently refluxed for 4 hours and neutralized with concentrated hydrochloric acid. The solid substance which separates on cooling is treated with hot 80% alcohol to remove a small amount of insoluble, rubbery material. The crystalline product obtained on cooling the alcoholic solution is pure ethyl-butadienyl barbituric acid,

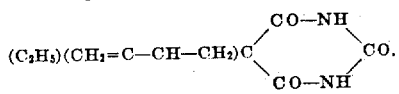

It melts at 137° C.

Ethyl-butadienyl barbituric acid may also be obtained by refluxing an alcoholic solution of ethyl barbituric acid and chloro-4-butadiene-1,2 in presence of ammonium acetate. A great variety of substituted barbituric acids may be used instead of the ethyl derivative and must be included in the scope of this process. These compounds are valuable hypnotic agents.

*Miscellaneous reactions*

To the reactions already described above may be added the following:

Example 20.—*Isomerization of hydroxy-4-butadiene-1,2*.—A solution of 2 g. of sodium in 138 g. of hydroxy-4-butadiene-1,2 is gently refluxed for 8 hours. Distillation furnishes an important fraction consisting of propargyl carbinol, $HC\equiv C-CH_2CH_2OH$. Propargyl carbinol is already described in the literature (C. R. 146 1035 (1908); Ann. Chim. (8), 27, 162 (1912)). It holds at about 136° C. at 761 mm. and has the specific gravity $$D_4^{20}\ 0.9315.$$

It gives triodo derivative, $I_2C=CI-CH_2-CH_2OH$ melting at 114° C. In addition to propargyl carbinol there is obtained a considerable amount of the isomeric alcohol hydroxy-4-butine-2, $CH_3-C\equiv C-CH_2OH$, boiling at about 139° C. at 761 mm. There is also some sirupy resin produced.

Example 21.—*Dehydration of hydroxy-4-butadiene-1,2*.—Fifty-eight grams of hydroxy-4-butadiene-1,2 is passed in an atmosphere of nitrogen over 100 cc. of granular basic aluminum sulfate during 2 hours at 250° C. From the condensate there is obtained 37 g. of unchanged carbinol and 8 g. of vinyl-acetylene, $HC\equiv C-CH=CH_2$.

Example 22.—*Butadienyl mercaptan and butadienyl sulfide*.—A solution of 180 g. of potassium hydroxide in 1000 cc. of alcohol is saturated with hydrogen sulfide. Two moles (177 g.) of chloro-4-butadiene-1,2 are then added with mechanical stirring while a slow stream of hydrogen sulfide is passed through the solution. The reaction evolves considerable heat. After addition of all the chloro compound, the mixture is stirred for 1½ hours, then filtered and the filtrate treated with 2000 cc. of water. The oil which separates at the bottom is decanted and treated with a 20% solution of sodium hydroxide (2 moles). The alkaline solution is washed with ether to remove the insoluble material, then acidified with 15% sulfuric acid and the resulting solution is again extracted with ether. This latter ethereal solution contains the mercaptan with a large amount of undistillable material. Butadienyl mercaptan, $CH_2=C=CH-CH_2SH$, boils at 53° C. at—

$$90\ mm.\ N_D^{20}\ 1.5482,\ D_4^{20}\ 0.9754.$$

The yield is about 30% of the theory.

The material insoluble in alkali gives on distillation butadienyl sulfide, $(CH_2=C=CH-CH_2)_2S$, a liquid boiling at 72-74° C. at—

$$5\ mm.,\ N_D^{20}\ 1.5561,\ D_4^{20}\ 0.9553.$$

This is obtained in 11% yield. Butadienyl mercaptan reacts readily with mercuric oxide to give the mercury derivative, $(CH_2=C=CH-CH_2S)_2Hg$, white crystals (from alcohol) melting at 70° C.

Example 23.—*Phenyl-p-tolyl butadienyl carbinol*.—0.085 mole of phenyl-p-toyl ketone, 0.085 mole of chloro-4-butadiene-1,2 and 0.17 at. of sodium are placed in 200 cc. of dry benzene and the mixture is refluxed for 8 hours. It is then treated with alcohol and water and extracted with benzene. Distillation gives 4.5 g. of a liquid boiling at 142-147° C. at $$0.5\ mm.,\ N_D^{20}\ 1.5985,\ D_4^{20}\ 1.0791.$$

which has the composition of phenyl p-tolyl butadienyl carbinol.

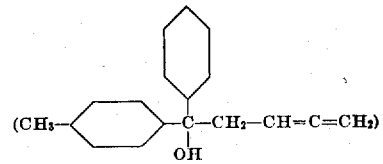

Yield 21% of the theory.

Some of the reactions of chloro-4-butadiene-1,3 involve the double bonds rather than the chlorine atom. Thus, the reaction with chlorine proceeds readily with the saturation of the double bonds and the formation of new and valuable chloro compounds as described in a copending application by Carothers and Berchet Serial No. 589,052, filed Jan. 26, 1931 now Patent No. 1,965,369, patented July 3, 1934. Similarly, chloro-4-butadiene-1,2 reacts very readily with concentrated sulfuric acid with the probable addition of sulfuric acid to the double bonds. The reaction is advantageously carried out at temperatures in the neighborhood of 0° C. and the resulting product is poured in water. By neutralization of this water solution and extraction with ether there is obtained beta-chloro-ethylmethyl ketone boiling 120-2° C. at atmospheric pressure. The above reaction therefore affords a new and convenient method for the preparation of beta-chloroethylmethyl ketone.

The action of certain reagents on chloro-4-butadiene-1,2 leads to its rearrangement with the formation of chloro-2-butadiene-1,3 (chloroprene) or to the elimination of hydrogen chloride with the formation of vinylacetylene and other unsaturated products having the composition $C_4H_4$. The formation of chloro-2-butadiene-1,3 is illustrated in the following example:

Fifty grams of chloro-4-butadiene-1,2 was refluxed for 3½ hours with 20 g. of cuprous chloride in 100 cc. of 18% hydrochloric acid. The oily layer was decanted, dried, and distilled. The entire specimen except for a small amount of undistillable residue came over between 59 and 63° C., and the distillate was pure chloro-2-butadiene-1,3.

In a similar manner when chloro-4-butadiene-1,2 was refluxed over dry cuprous cyanide it was converted into chloro-2-butadiene-1,3. The same transformation is observed when chloro-4-butadiene-1,2 is passed into quinoline at 140 to 150° C. or is passed over silica gel at 290° C.

When chloro-4-butadiene-1,2 is treated with strong caustic alkalies such as potassium hydroxide, sodium hydroxide, etc., in the dry state or in aqueous or alcoholic solution, the principal reaction consists in the elimination of hydrogen chloride with the formation of vinylacetylene. At the same time appreciable amounts of a higher boiling, very poisonous, and readily polymerizable hydrocarbon are formed. This hydrocarbon is believed to be butadiene, $CH_2=C=C=CH_2$ This is illustrated by the following example:
One mole of chloro-4-butadiene-1,2 is added to 2 moles of powdered potassium hydroxide and the mixture is gently heated until a vigorous reaction sets in. The distillate which collects in the thoroughly cooled receiver is redistilled and is thus shown to be a mixture of vinylacetylene (31% of the theory), chloroprene (12.5% of the theory), and unchanged chloro-4-butadiene-1,2.

One mole of chloro-4-butadiene-1,2 was added to one mole of sodium butylate in 400 cc. of butyl alcohol during one hour, and the mixture was then refluxed for 2 hours. The volatile product which escaped through the vertical condenser was caught in a cold receiver. On redistillation it gave 75% of the theoretical amount of vinylacetylene and a small fraction boiling at 20-25° C. This had the nauseating odor and poisonous properties ascribed to butatriene, and within 15 minutes at room temperature it had polymerized to an opaque solid.

By the action of certain reducing agents chloro-4-butadiene-1,2 is converted into butadiene. Thus, when chloro-4-butadiene-1,2 is treated with a mixture of zinc dust and alcohol the principal product formed is butadiene-1,3.

In general, the reactions described above which involve the use of chloro-4-butadiene-1,2 and which result in the formation of butadienyl compounds, yield a highly ionized chloride, e. g., chloro-4-butadiene-1,2 when reacted with sodium carbonate in aqueous solutions, yields 1,2-butadienol-4 and sodium chloride, chloro-4-butadiene-1,2 when reacted with ammonia yields 1,2-butadienylamine-4 and hydrogen chloride, etc.

In addition to the use of chloro-4-butadiene-1,2 in the reactions described above, the invention is intended to include also the use of other halogen-4-butadienes-1,2, e. g., bromo-4-butadiene-1,2.

The above description and examples are intended to be construed as illustrative only. Any modification or variation thereof which conforms to the spirit of the invention is intended to be included within the scope of the claims.

We claim:
1. In the process of forming butadienyl compounds, the step which comprises reacting a halogen-4-butadiene-1,2 with an alkali metal compound of the group consisting of alkali metal phenolates, alkali metal salts of organic acids, alkali metal cyanides and thiocyanates, and alkali metal salts of compounds having a methylene group in which the alkali metal is substituted for a hydrogen atom and which methylene group also has attached to it two carbonyl groups.

2. In the process of forming butadienyl compounds, the step which comprises reacting chloro-4-butadiene-1,2 with an alkali metal compound of the group consisting of alkali metal phenolates, alkali metal salts of organic acids, alkali metal cyanides and thiocyanates, and alkali metal salts of compounds having a methylene group in which the alkali metal is substituted for a hydrogen atom and which methylene group also has attached to it two carbonyl groups.

3. A 4-substituted butadienyl compound obtainable by the process of claim 2.

4. The process which comprises reacting chloro-4-butadiene-1,2 with an alkali metal derivative of an organic compound having a methylene group attached to two carbonyl groups as in the following general formula:

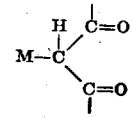

in which M represents an alkali metal.

5. A compound containing a radical of the formula:

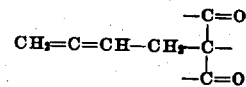

said compound being obtainable by the process of claim 2.

6. In the process of forming butadienyl compounds, the step which comprises heating chloro-4-butadiene-1,2 with an alkali metal derivative of malonic (dialkyl) ester.

7. In the process of forming butadienyl compounds, the step which comprises heating chloro-4-butadiene-1,2 with an alkali metal derivative of malonic (dialkyl) ester saponifying the product then heating to remove one of the carboxyl groups.

8. A 1,2-butadienyl-4-malonic (dialkyl) ester.
9. In the process of forming butadienyl compounds, the step which comprises heating chloro-4-butadiene-1,2 and a barbituric acid in the presence of a condensing agent.

10. The process which comprises dissolving ethyl barbituric acid in a solution of sodium hydroxide in water, then adding chloro-4-butadiene-1,2 and heating to complete the reaction and then separating ethyl-butadienyl barbituric acid from the reaction mass.

11. A barbituric acid containing a 1,2-butadienyl radical in place of one of the hydrogen atoms of its active methylene group.

12. Ethyl-butadienyl barbituric acid of the formula—

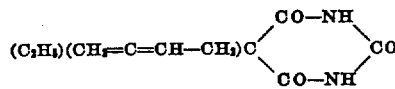

13. In the process of forming butadienyl compounds, the step which comprises heating chloro-4-butadiene-1,2 with an alkali metal derivative of acetoacetic ester.

14. A 1,2-butadienyl-4-acetoacetic ester.

WALLACE H. CAROTHERS.
GERARD J. BERCHET.

Certificate of Correction

Patent No. 2,073,363.                                            March 9, 1937.

WALLACE H. CAROTHERS ET AL.

It is hereby certified that errors appear in the printed specification of the above numbered patent requiring correction as follows: Page 1, first column, line 43, for "obect" read *object*; page 3, second column, line 75, for "filtration", second occurrence, read *filtrate*; page 4, first column, Example 9, for "βδ-dimethoxycaleronitrile" read *βδ-Dimethoxyvaleronitrile*; page 7, first column, line 71, for "holds" read *boils*; page 8, first column, line 4, for "1931" read *1932*, and line 49, for "butadiene" read *butatriene*; and that the said Letters Patent should be read with these corrections therein that the same may conform to the record of the case in the Patent Office.

Signed and sealed this 25th day of May, A. D. 1937.

[SEAL]

HENRY VAN ARSDALE,
*Acting Commissioner of Patents.* pounds, the step which comprises heating chloro-4-butadiene-1,2 and a barbituric acid in the presence of a condensing agent.

10. The process which comprises dissolving ethyl barbituric acid in a solution of sodium hydroxide in water, then adding chloro-4-butadiene-1,2 and heating to complete the reaction and then separating ethyl-butadienyl barbituric acid from the reaction mass.

11. A barbituric acid containing a 1,2-butadienyl radical in place of one of the hydrogen atoms of its active methylene group.

12. Ethyl-butadienyl barbituric acid of the formula—

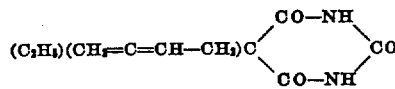

13. In the process of forming butadienyl compounds, the step which comprises heating chloro-4-butadiene-1,2 with an alkali metal derivative of acetoacetic ester.

14. A 1,2-butadienyl-4-acetoacetic ester.

WALLACE H. CAROTHERS.
GERARD J. BERCHET.

Certificate of Correction

Patent No. 2,073,363.     March 9, 1937.

WALLACE H. CAROTHERS ET AL.

It is hereby certified that errors appear in the printed specification of the above numbered patent requiring correction as follows: Page 1, first column, line 43, for "obect" read *object*; page 3, second column, line 75, for "filtration", second occurrence, read *filtrate*; page 4, first column, Example 9, for "βδ-dimethoxycaleronitrile" read *βδ-Dimethoxyvaleronitrile*; page 7, first column, line 71, for "holds" read *boils*; page 8, first column, line 4, for "1931" read *1932*, and line 49, for "butadiene" read *butatriene*; and that the said Letters Patent should be read with these corrections therein that the same may conform to the record of the case in the Patent Office.

Signed and sealed this 25th day of May, A. D. 1937.

[SEAL]

HENRY VAN ARSDALE,
*Acting Commissioner of Patents.*

Certificate of Correction

Patent No. 2,073,363.    March 9, 1937.

WALLACE H. CAROTHERS ET AL.

It is hereby certified that errors appear in the printed specification of the above numbered patent requiring correction as follows: Page 1, first column, line 43, for "obect" read *object*; page 3, second column, line 75, for "filtration", second occurrence, read *filtrate*; page 4, first column, Example 9, for "βδ-dimethoxycaleronitrile" read *βδ-Dimethoxyvaleronitrile*; page 7, first column, line 71, for "holds" read *boils*; page 8, first column, line 4, for "1931" read *1932*, and line 49, for "butadiene" read *butatriene*; and that the said Letters Patent should be read with these corrections therein that the same may conform to the record of the case in the Patent Office.

Signed and sealed this 25th day of May, A. D. 1937.

[SEAL]

HENRY VAN ARSDALE,
*Acting Commissioner of Patents.*